United States Patent [19]
Kojima et al.

[11] Patent Number: 5,422,870
[45] Date of Patent: Jun. 6, 1995

[54] OPTICAL PICKUP FOR INFORMATION RECORDING/REPRODUCING APPARATUS

[75] Inventors: Kouki Kojima; Syougo Horinouchi, both of Fukuoka, Japan

[73] Assignee: Matsushita Electric Industrial Co., Ltd., Osaka, Japan

[21] Appl. No.: 18,573

[22] Filed: Feb. 17, 1993

Related U.S. Application Data

[63] Continuation-in-part of Ser. No. 952,224, Sep. 28, 1992.

[30] Foreign Application Priority Data

| Sep. 27, 1991 | [JP] | Japan | 3-249005 |
| Nov. 13, 1991 | [JP] | Japan | 3-296818 |
| Feb. 19, 1992 | [JP] | Japan | 4-031744 |
| Mar. 27, 1992 | [JP] | Japan | 4-070707 |
| Apr. 14, 1992 | [JP] | Japan | 4-094035 |

[51] Int. Cl.⁶ .............................................. G11B 7/095
[52] U.S. Cl. ............................ 369/44.12; 369/44.23; 369/44.24; 369/112; 369/118
[58] Field of Search ............... 369/44.12, 44.23, 44.24, 369/112, 117, 118; 359/15, 22, 25, 566, 572

[56] References Cited
U.S. PATENT DOCUMENTS 4,731,772 3/1988 Lee .
4,757,197 7/1988 Lee .
5,113,386 5/1992 Whitehead et al. ............... 369/44.41
5,198,916 3/1993 Kim ................................. 369/44.23 X

*Primary Examiner*—W. R. Young
*Attorney, Agent, or Firm*—Lowe, Price, LeBlanc & Becker

[57] ABSTRACT

An optical pickup for use in optically recording or picking up information on and from a recording medium using a light-emitting device. The optical pickup comprises first and second light reflecting surfaces disposed in opposed relation to each other, the first reflecting surface reflects a light beam from the light-emitting device and the second reflecting surface reflects the light beam reflected from the first reflecting surface. Around the first reflecting surface there is provide a grating lens which condenses the light beam reflected from the second reflecting surface to be focused on the recording medium. The light beam from the recording medium is reflected by the second reflecting surface to be directed to the first reflecting surface. The first reflecting surface diffracts the reflected light beam from the second reflecting surface toward a light receiving device to read the information concurrently detecting focusing and tracking error signals. This arrangement can achieve the size-reduction of the optical pickup.

8 Claims, 14 Drawing Sheets

OPTICAL PICKUP FOR INFORMATION RECORDING/REPRODUCING APPARATUS

CROSS-REFERENCE TO COPENDING APPLICATION

This application is a continuation-in-part of a copending application Ser. No. 952,224, titled "OPTICAL PICKUP FOR INFORMATION RECORDING/REPRODUCING APPARATUS", filed on Sep. 28, 1992, pending.

BACKGROUND OF THE INVENTION

The present invention relates to an optical pickup to be used in information recording/reproducing apparatus such as an optical disc apparatus for optically recording and reproducing information.

Recently, improvement for the optical disc apparatus is being made increasingly for size-reduction and weight-reduction purposes. The size-reduction and weight-reduction also allow improvement of its performance such as shortening the access time. For achieving these purposes, one known technique involves constructing the optical pickup with a hologram optical device. FIG. 14 shows an arrangement of a conventional optical pickup. In FIG. 14, numeral 231 designates a hologram optical device comprising a glass-made base, a hologram 235 provided on the upper surface of the base and a grating 236 provided on the lower surface of the base. As illustrated in FIG. 14, a light emitted from a semiconductor laser 230 is divided by the grating 236 into three beams, i.e., two tracking detecting sub-beams and a signal reading main beam, and directed toward the hologram 235. The light beams passing through the hologram 235 are converted into parallel rays through a collimator lens 232 and then condensed through an objective lens 233 on a disc 237 so as to be reflected thereon. The reflected light including information recorded on the disc 237 again passes through the objective lens 233 and the collimator lens 232 before diffracted by the hologram 235 to be led to a 5-divided photodetector 234. Here, the hologram 235 has 2 areas which are different in grating period from each other, and hence the incident light is wave-front-converted by the hologram 235 so as to be focused (condensed) on a predetermined position of the 5-divided photodetector 234. When a focussing error occurs, the focusing position of the 5-divided photodetector 234 varies, thereby obtaining a focusing error signal. In addition, in response to occurrence of a tracking error, a difference in intensity between the reflected lights of the 2 tracking detecting sub-beams occurs, thereby obtaining a tracking error signal.

There is a problem which arises with such an arrangement of the conventional optical pickup, however, in that the optical length from the semiconductor laser 230 to the objective lens 233 becomes long to make it difficult to reduce the thickness of the optical pickup.

SUMMARY OF THE INVENTION

It is therefore an object of the present invention to provide an optical pickup which allows its size-reduction and improvement of its performance.

According to this invention, in an optical pickup equipped with light-emitting means disposed in opposed relation to an optical disc for emitting light toward the optical disc and light-receiving means disposed in opposed relation to the optical disc for receiving light reflected from the optical disc, a transparent member is disposed between the light-emitting means, the light-receiving means and the optical disc, the transparent member having a first surface facing the optical disc and a second surface facing the light-emitting means and the light-receiving means which first and second surfaces are parallel to each other. On the first surface there are provided a first circular reflection surface for reflecting the light from the light-emitting means, a reflection type hologram for diffracting incident light and a grating lens for focusing light on the optical disc. Further, on the second surface there is provided a second reflection surface for reflecting light, reflected from the first reflection surface, toward the grating lens. In the second reflection surface there are formed an incident window for leading the light from the light-emitting means into the transparent member and an outgoing window for leading diffracted light from the reflection type hologram to the light-receiving means.

Preferably, a distance from the second reflection surface to the light-receiving means is adjusted in accordance with the relation between a wavelength of the light to be emitted from the light-emitting means and a design wavelength of the grating lens, the second reflection surface and the light-receiving means being fixed to each other through a transparent resin after the adjustment. That is, when the wavelength of the light to be emitted from the light-emitting means is longer than the design wavelength of the grating lens, the distance from the second reflection surface to the light-receiving means is arranged to be shorter than a design value, and when the wavelength of the light to be emitted from the light-emitting means is shorter than the design wavelength of the grating lens, the distance from the second reflection surface to the light-receiving means is arranged to be longer than the design value.

Further, an optical pickup according to this invention comprises deflecting means disposed in a path of reflected light from the optical disc for deflecting and separating the reflected light from the optical disc. The light-receiving means receives light from the deflecting means. Preferably, the deflecting means is a grating which is manufactured on an LiNbO$_3$ substrate in accordance with an proton exchange method and which is inclined 45° with respect to a deflection plane of the outgoing light of the light-emitting means or a diffraction device having a periodic structure below ½ of a wavelength of the reflected light from the optical disc.

Thus, the present invention provides an optical pickup comprising reflection type grating means disposed on the first reflecting surface means for diffracting light which is reflected by the optical disc and which reflected by the second reflecting surface means after passing through the leans means, the reflection type grating means being manufactured on an LiNbO$_3$ substrate in accordance with a proton exchange method and inclined by 45° with respect to a deflection plane of the outgoing light from the light-emitting means, the light-receiving means receiving light from the reflection type grating means.

Further, this invention provides an optical pickup comprising reflection type grating means disposed on the second reflecting surface means for diffracting light which is reflected by the optical disc and which reflected by the second reflecting surface means and the first reflecting surface means after passing through the leans means, the reflection type grating means being manufactured on an LiNbO₃ substrate in accordance with a proton exchange method and inclined by 45° with respect to a deflection plane of the outgoing light from the light-emitting means, the light-receiving means receiving light from the reflection type grating means.

Still further, this invention provides an optical pickup comprising a hologram disposed within a path of the light from the light-emitting means for separating the light from the light-emitting means, first light-receiving means for receiving light from the hologram, deflecting means disposed within a path of light reflected from the optical disc for deflecting and separating the light from the optical disc, and second light-receiving means for receiving light from the deflecting means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
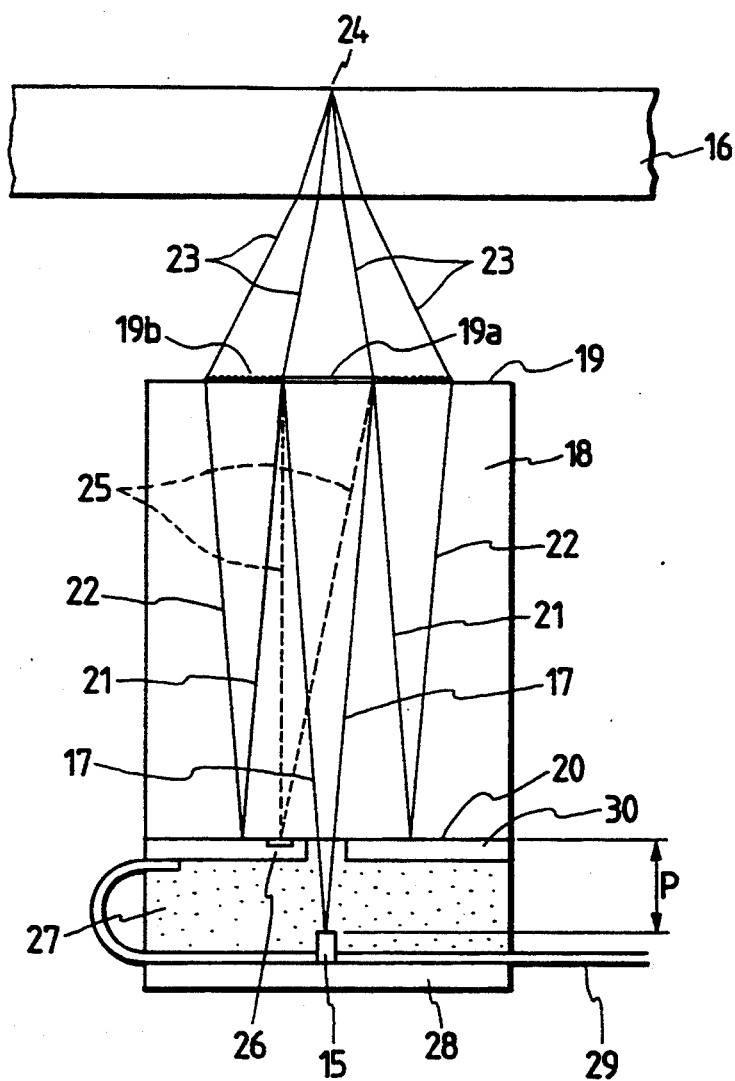
FIG. 1 shows an arrangement of an optical pickup according to a first embodiment of this invention.

An optical pickup according to a first embodiment of this invention will be described hereinbelow with reference to FIG. 1. First, the description will be made in terms of an optical path from a semiconductor laser 15 to an optical disc 16. In FIG. 1, light 17 emitted from the semiconductor laser 15 is diverged or spread out to reach a first surface 19 of a lens member (transparent member) 18. At the vicinity of the optical axis of the first surface 19, there is provided a reflection minor section 19a having a reflection type hologram whereby the emitted light 17 is reflected thereon and directed as the 0-order diffracted light of the reflection type hologram toward a second surface 20 of the lens member 18 as shown at numeral 21. The second surface 20 is parallel to the first surface 19. Here, since except for window portions for the incidence and outgoing of the laser light from the semiconductor laser 15 the second surface 20 is minor-coated, the light 21 is again reflected thereon so as to be directed toward the first surface 19 as shown at numeral 22. The light 22 is converged through a transmission type grating lens 19b, provided around the reflection mirror section 19a, so as to be focused on a point 24 of the optical disc 16 as illustrated at numeral 23. The grating lens 19b is of the type that is arranged such that the pitch gradually becomes smaller toward its circumferential portion to provide a focusing effect. Here, since the light reaching the center portion of the transmission type grating lens 19b is cut (shielded) by the reflection mirror section 19a, an spot image is formed on the optical disc 16. The spot image can be made to have a diameter smaller than the Airy disc diameter of the spot image intensity distribution in an aberration-free circular aperture optical system.

Secondly, a description will be made in terms of the reflection optical path of the optical disc 16. The laser light modulated in accordance with the recorded information and reflected from the optical disc 16 passes through the transmission type grating lens 19b as illustrated at numeral 22 so as to be reflected on the second surface 20 of the lens member 18 to be directed toward the reflection mirror section 19a as illustrated at numeral 21, before being reflected on the reflection mirror 19a to become the first-order diffracted light of the reflection type hologram as designated at numeral 25. This first-order diffracted light 25 passes through an outgoing window, provided at the mirror-coated portion of the second surface 20 of the lens member 18, so as to be focused on a multi-divided photosensor 26. The reflection type hologram formed on the reflection mirror 19a comprises at least 2 areas whose interference periods are different from each other to provide the focusing error detection function and the tracking error detection function.

Figure 2:
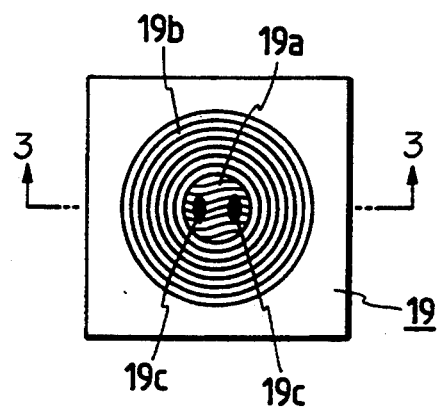
FIG. 2 a plan view showing a first surface of a lens member including a reflection type hologram provided on a portion of a reflection mirror section and a transmission type grating lens.
Figure 3:
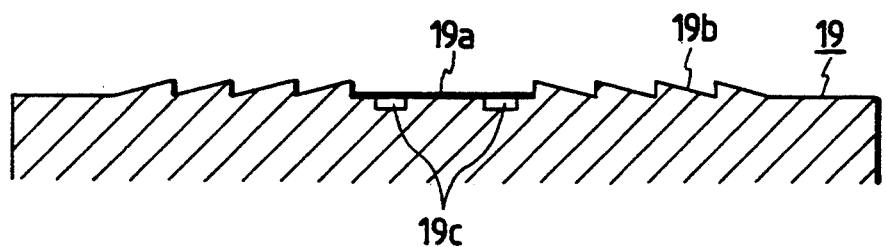
FIG. 3 is a cross-sectional view taken along 3—3 line in FIG. 2.

FIG. 2 shows the reflection type hologram (two holograms designated at 19c), provided on a portion of the reflection mirror section 19a, and the transmission type grating lens 19b, and FIG. 3 is a cross-sectional view taken along A—A line in FIG. 2. Here, a phase type hologram is used as the reflection type hologram 19c with a viewpoint of the diffraction efficiency, and a chirped in-line type lens whose cross section has a staircase- or saw-tooth-like configuration is used as the transmission type grating lens 19b with a viewpoint of the diffraction efficiency and the light-converging performance. The reflection hologram 19c and the transmission type grating lens 19b can be manufactured in accordance with the 2P (PHOTO POLYMERIZATION) method or the like.

Figure 4:
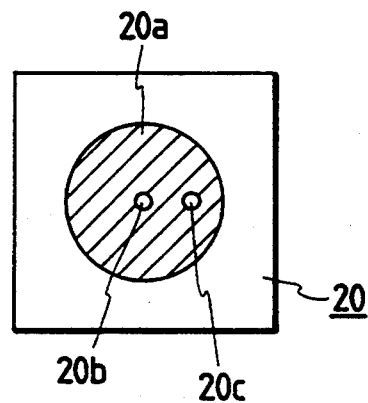
FIG. 4 is a plan view showing a second surface of the lens member including a mirror-coated portion.

FIG. 4 is a plan view showing the mirror-coated portion of the second surface 20 of the lens member 18. On the second surface 20 there is provided the reflection mirror-coated portion (designated at 20a), and in the reflection mirror-coated portion 20a there are provided an incident window 20b for the semiconductor laser 15 and an outgoing window 20c for the multi-divided photosensor 26.

Returning back to FIG. 1, a description will be made hereinbelow in terms of the semiconductor laser 15. The semiconductor laser 15 is fixed onto a radiating plate 28 for the heat radiation and reinforcement and electrically coupled to a thin flexible wiring member 29 placed on the radiating plate 28. The semiconductor laser 15 is separated by a predetermined distance P from the second surface 20 of the lens member 18, and a transparent resin such as an acrylic resin 27 is provided between the second surface 20 and the semiconductor laser 15 for sealing and adhesion. Further, the electric signal from the multi-divided photosensor 26 is electrically coupled through a sensor base 30 to the flexible wiring member 29.

Figure 5:
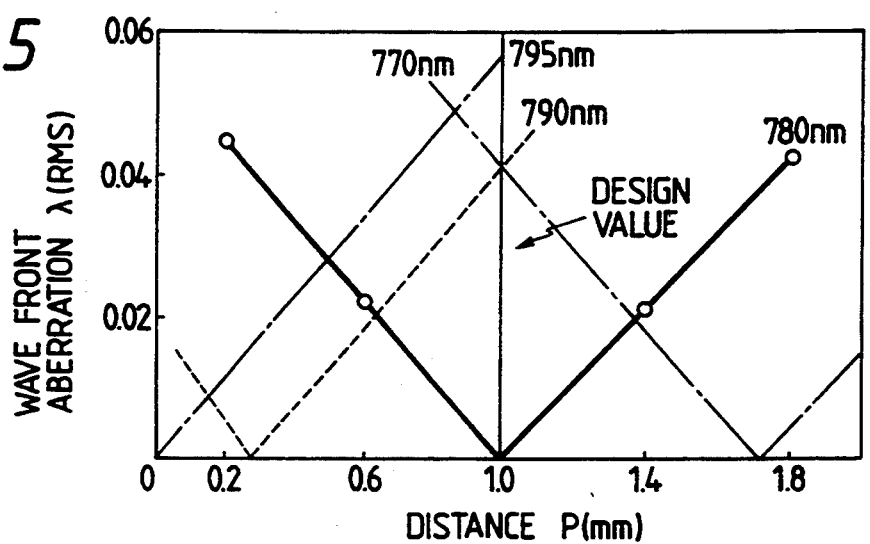
FIG.5 is a graphic diagram showing variation of the wavefront aberration at a focusing point in accordance with variation of the distance between the second surface and a semiconductor laser.

Further, a description will be made in terms of the adjustment of the distance P between the second surface 20 and the semiconductor laser 15. FIG. 5 is a graphic diagram showing the variation of the wavefront aberration (RMS) at the focusing point in accordance with the variation of the distance P with respect to a grating lens designed under the conditions of NA (numerical aperture)=0.45; lens member length=5 mm, working distance=2 mm and laser wavelength=780 nm. As seen from FIG. 5, in the case that the wavelength becomes 770 nm shorter than the wavelength in design, the wavefront aberration becomes 0 when the distance P is about 1.72 mm. On the other hand, in the case that the wavelength becomes 790 nm longer than the wavelength in design, the wavefront aberration becomes 0 when the distance P is about 0.28. Thus, before fixing the semiconductor laser 15 to the second surface 20 through the transparent resin 27, the distance P is adjusted in accordance with the variation of the wavelength of the semiconductor laser 15, thereby reducing the wavefront aberration.

According to this embodiment, the light emitted from the semiconductor 15 is arranged to go and return within an optical system so as to ensure the necessary optical path length even if the distance between the semiconductor laser 15 and the transmission type grating lens 19b is short. Accordingly, it is possible to realize the size-reduction of the optical pickup. In addition, before adhering the semiconductor laser 15 by the transparent resin 27, in the case that the laser wavelength of the semiconductor laser 15 is longer than the designed reference wavelength of the semiconductor laser 15 with respect to the transmission grating lens 19b, the distance from the second surface 20 to the semiconductor laser 15 is arranged to be shorter than the designed reference value, and in the case of being shorter than the designed reference wavelength, the distance therebetween is arranged to be longer than the designed reference value, whereby it is possible to absorb the difference in oscillation wavelength between the semiconductor lasers and hence it is possible to reduce the wavefront aberration due to the difference in the wavelength. This effect can improve the productivity of the optical pickup, because it is not required to select a semiconductor laser to be used as the semiconductor laser 15 and perform the matching in wavelength between the lights from the transmission type grating lens 19b and the semiconductor laser 15.

Figure 6:
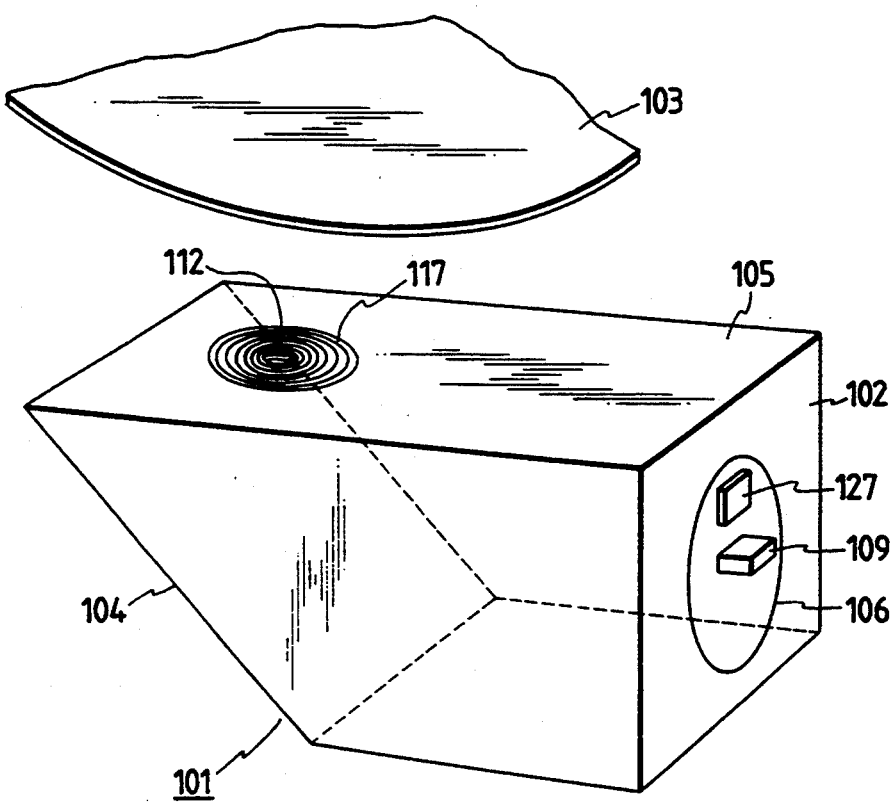
FIG. 6 is a perspective view showing an optical pickup according to a second embodiment of this invention.
Figure 7:
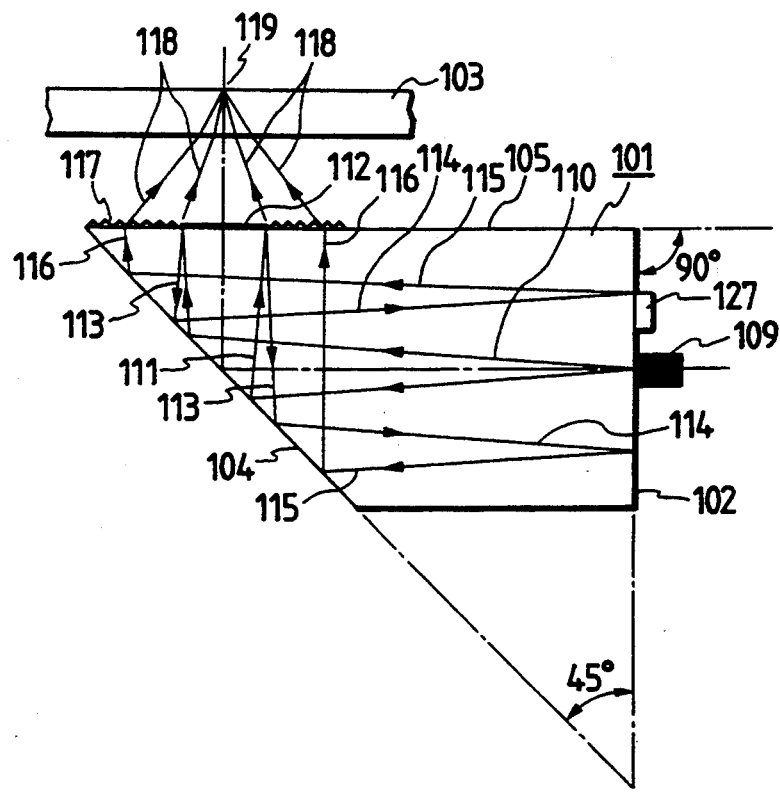
FIG. 7 shows an outgoing optical path in the FIG. 6 optical pickup.
Figure 11:
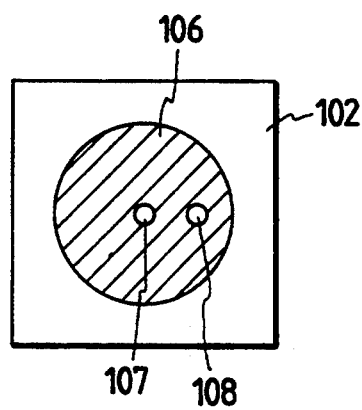
FIG. 11 is a plan view showing a mirror-coated portion provided on one surface of a prism in the FIG. 6 optical pickup.

Moreover, a description will be made hereinbelow in terms of an optical pickup according to a second embodiment of this invention. FIG. 6 is a perspective view showing the optical pickup according to the second embodiment of this invention and FIG. 7 shows the outgoing optical path in the FIG. 6 optical pickup. In FIGS. 6 and 7, numeral 101 represents a polygon (trapezoid) prism having first to third surfaces 102, 105 and 104. The first surface 102 is a surface perpendicular to an optical disc 103 surface, the second surface 105 is a surface meeting at right angles (90°) to the first surface 102, and the third surface 104 is a surface meeting at an angle of 45° to the first and second surfaces 102 and 105. On the first surface 102 there is provided a reflection mirror-coated portion 106 whereby light is reflected on the inner surface of the prism 101. In the reflection mirror-coated portion 106 there are provided a multi-divided photosensor 127 and a semiconductor laser 109 which are fixed through a transparent adhesive resin and which are placed on the same wiring base. FIG. 11 is a plan view showing the mirror-coated portion 106. As illustrated in FIG. 11, in the reflection mirror-coated portion 106 formed on the first surface 102 of the prism 101, there are provided an incident window 107 for the laser light from the semiconductor laser 109 and an outgoing window 108 for the laser light to the multi-divided photosensor 127.

Figure 9:
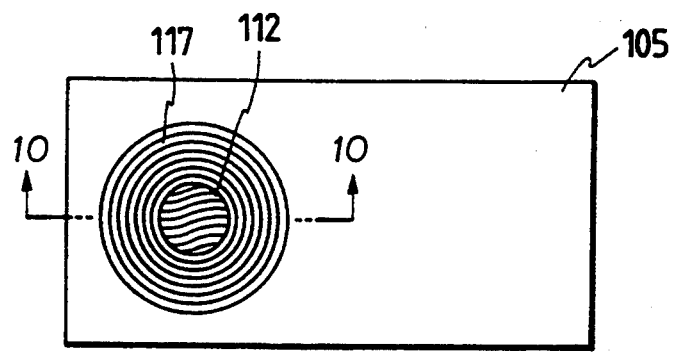
FIG. 9 shows a reflection type hologram and a transmission type grating lens provided on a second surface of a prism in FIG. 6 optical pickup.
Figure 10:
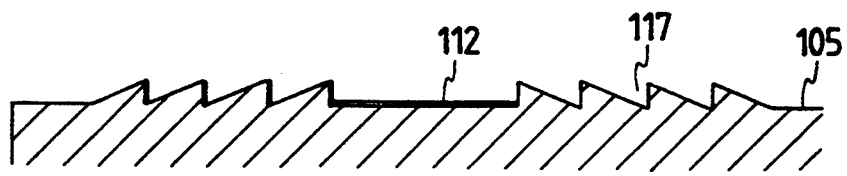
FIG. 10 is a cross-sectional view take along a line 10—10 in FIG. 9.

FIG. 9 shows a reflection type hologram 112 and a transmission type grating lens 117 provided on the second surface 105 of the prism 101, and FIG. 10 is a cross-sectional view take along a line A—A in FIG. 9. The reflection type hologram 112 is constructed as a phase type hologram with a viewpoint of the diffraction efficiency and the transmission type grating lens 117 is of the chirped in-line type that has a staircase- or saw-tooth-like configuration to have a high light-converging performance and diffraction efficiency. The reflection type hologram 112 and the transmission type grating lens 117 are similarly manufactured in accordance with the 2P method or the like.

Here, a description will be made with reference to FIG. 7 in terms of the optical path from the semiconductor laser 109 up to the optical disc 103. Light 110 emitted from the semiconductor laser 109 is diverged or spread out so as to be directed to the third surface 104. The light 110 is reflected on the third surface 104 to be directed to the second surface 105 as illustrated at numeral 111. The reflected light 111 reaches the reflection type hologram 112 to be reflected thereon to become 0-order diffracted light 113. The 0-order diffracted light 113 is again directed to the third surface 104 to be reflected toward the first surface 102 as illustrated at numeral 114. The light 114 is reflected on the reflection mirror-coated portion 106 on the first surface 102 to reach the third surface 104 as shown at numeral 115. The light reflected on the third surface 104 is directed toward the second surface 105 as illustrated at numeral 116. The light 116 passes through the transmission type grating lens 117, provided around the reflection type hologram 112, to be focused on a point 119 on the optical disc 103 as illustrated at numeral 118. At this time, the light reaching the center portion of the transmission type grating lens 117 is cut by the reflection type hologram 112, and hence it is possible to reduce the diameter of the focused light spot on the optical disc 103.

Figure 8:
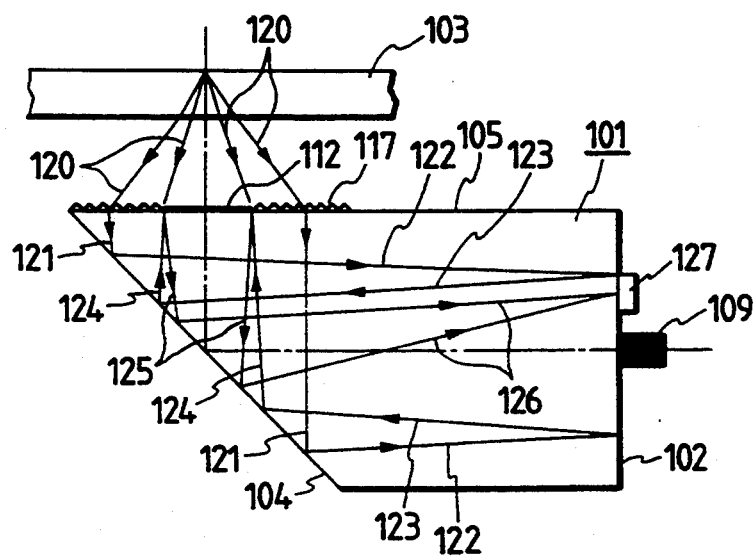
FIG. 8 shows a reflection path of light from an optical disc.

FIG. 8 shows a reflection path of the light from the optical disc 103. Reflected light 120 from the optical disc 103 which includes the information recorded on the optical disc 103 passes through the transmission type grating lens 117 to be directed toward the third surface 104 as illustrated at numeral 121. Light 122 reflected on the third surface 104 is directed to the reflection mirror-coated portion 106 on the first surface 102 before being again reflected on the third surface 104 to be directed to the reflection hologram 112 as shown at numeral 124. The light reflected on the reflection type hologram 112 becomes the first-order diffracted light 124 which is in turn reflected on the third surface 104 to pass through the multi-divided photosensor outgoing window 108 to be focused on the multi-divided photosensor 127 as illustrated at numeral 126. This reflection type hologram 112 comprises 2 areas whose interference periods are different from each other to provide a focusing error detection function and a tracking error detection function.

Figure 12:
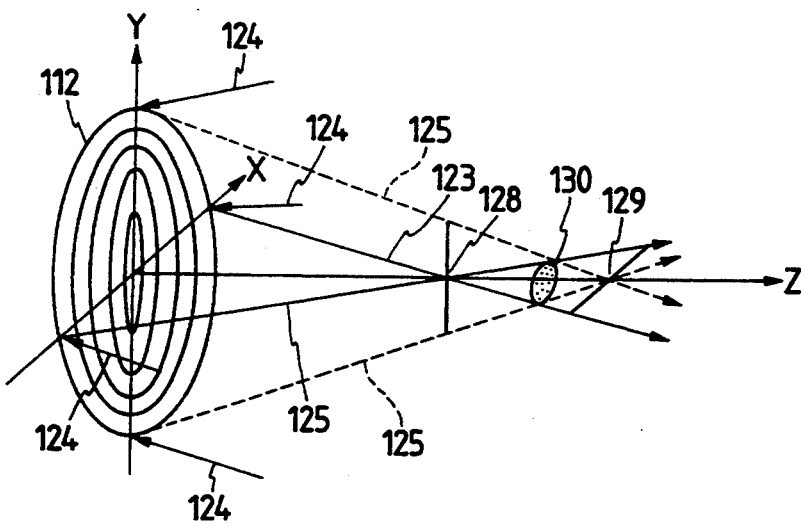
FIG. 12 is an illustration for describing the function of a reflection type hologram.

A method of detecting the focusing error will be described hereinbelow with reference to FIG. 12 which is an illustration for describing the function of the reflection type hologram 112. In FIG. 12, orthogonal axes X, Y are taken on the surface of the reflection type hologram 112 and further a Z axis is taken which is orthogonal to the X and Y axes. The hologram pattern of the reflection type hologram 112 is arranged to generate the astigmatic aberration such that the X-axis component of the first-order diffracted light 125 is focused on an X-axis focus 128 and the Y-axis component thereof is focused on a Y-axis focus 129. The cross section of the first-order diffracted light 125 at the X-axis focus 128 has a linear configuration extending in the Y-axis directions and the cross section of the first-order diffracted light 125 at the Y-axis focus 129 has a linear configuration extending in the X-axis direction. Between the X-axis focus 128 and the Y-axis focus 129 the first-order diffracted light 125 has a circular cross section as illustrated at numeral 130.

Figure 13A:
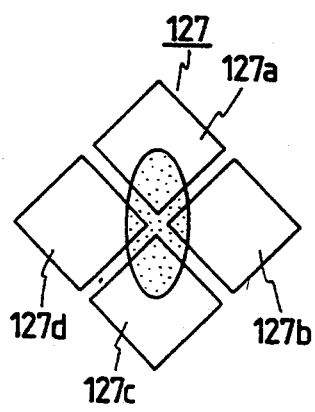
FIGS. 13A to 13C are illustrations for describing focusing states between an optical disc and a transmission type grating lens.
Figure 13B:
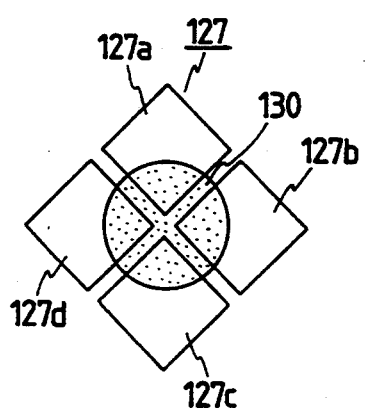
Figure 13C:
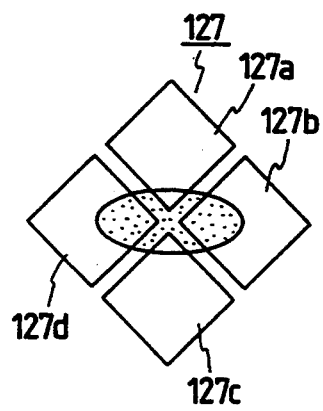
Figure 14:
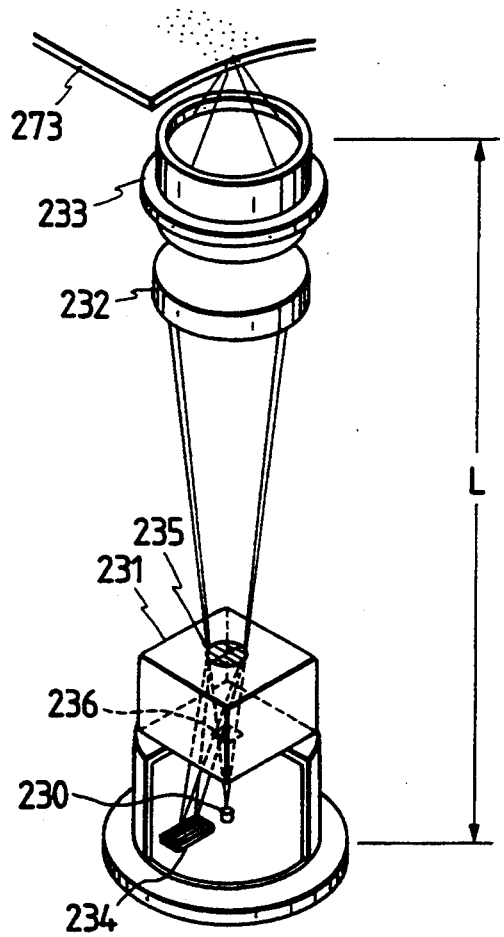
FIG. 14 is an illustration for describing a conventional optical pickup.

Now, when the transmission type grating lens 117 takes the focusing state with respect to the optical disc 103, the position of the multi-divided photosensor 127 is adjusted so that the multi-divided photosensor 127 is placed at the circular cross section 130 position. First, as illustrated in FIG. 13B, when taking the focusing state, the positional relation of the respective division portions 127a to 127d of the multi-divided sensor 127 with respect to the circular cross section 130 is adjusted so that the electric outputs of the respective division portions 127a to 127d become equal to each other. In the case that the optical disc 103 moves away from the transmission type grating lens 117, the X-axis focus 128 and the Y-axis focus 129 are respectively close to the reflection type hologram 112 and hence the light spot has an elliptical configuration extending in the X-axis direction as illustrated in FIG. 13C. Thus, the sum of the electric outputs of the division portions 127a and 127c becomes smaller than the sum of the electric outputs of the division portions 127b and 127d. On the other hand, in the case that the optical disc 103 approaches the transmission type grating lens 117, since the X-axis focus 128 and the X-axis focus 129 are respectively separated from the reflection type hologram 112, the light spot has an elliptical configuration extending in the Y-axis direction as illustrated in FIG. 13A. Thus, the sum of the electric outputs of the division portions 127a and 127c becomes greater than the sum of the electric outputs of the division portions 127b and 127d. The focusing error detection can be effected on the basis of the relation in magnitude between the sum of the electric outputs of the division portions 127a, 127c and the sum of the electric outputs of the division portions 127b, 127d. This is known as the so-called astigmatic method. Similarly, it is possible to perform the tracking error detection in accordance with the so-called push-pull method.

As described above, according to this embodiment, since the laser light is arranged to be reflected within the prism 101, it is possible to ensure the necessary optical path length. In addition, since the prism 101, semiconductor laser 109 and multi-divided photosensor 127 are integrally constructed, it is possible to construct an optical pickup having a extremely small dimension.

Figure 15:
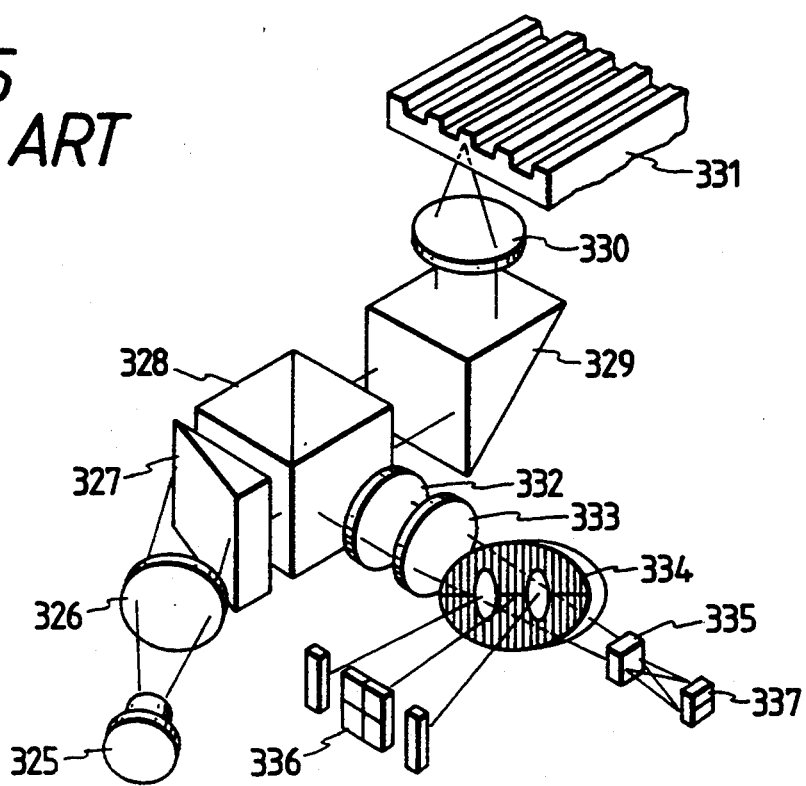
FIG. 15 is a perspective view showing an arrangement of the conventional optical pickup.

Moreover, a description will be described in terms of a third embodiment of this invention. This embodiment relates to an optical pickup suitable for an information recording/reproducing apparatus which optically records or reproduces information in or from a photomagnetic disc. Prior to describing the third embodiment of this invention, a brief description will be described hereinbelow in terms of a conventional optical pickup for such a photomagnetic disc. FIG. 15 is a perspective view showing an arrangement of the conventional optical pickup. In FIG. 15, a light beam emitted from a semiconductor laser 325 passes through a collimator lens 326 and a prism anamorphic 327 so as to be converted into a parallel circular light beam, and then passes through a PBS prism 328 and a lifting mirror 329 so as to be condensed on a disc 331 through an objective lens 330. The condensed light beam is reflected as a signal light beam after picking up the recorded signal from the disc 331. At this time, since the recorded signal is recorded on the basis of the difference between the magnetization directions, the rotational direction of the deflection plane of the signal light beam varies due to the recorded signal in accordance with the Kerr Effect. Thereafter, the signal light beam passes through the same objective lens 330 and lifting mirror 329 to be incident on the PBS prism 328 to be separated from the main optical axis, then reaching a half-wave plate 332 to cause the deflection direction to rotate by 90° to become TM wave with respect to a hologram device 334. The light beam from the half-wave plate 332 is incident on the hologram device 334 at the Bragg angle after passing through a lens 333. The first-order diffracted light due to the hologram device 334 is focused on a 6-division photodetector 336 to obtain the focusing error signal and the tracking error signal. The hologram device 334 comprises 4 holograms, and the measurement of the focusing error signal is effected in accordance with the double knife edge method in which the variation of the image-formation pattern due to the defocusing at the focusing position is detected by a 4-division sensor and the measurement of the tracking error signal is effected in accordance with the push-pull method in which the variation of the intensity of light incident on two holograms is detected by a 2-division sensor. Further, for reading the signal, the zero-order diffracted light is directed through an analyzer 335 to a 2-division photodetector 337. This arrangement has disadvantages that there is a limit in the size-reduction and weight-reduction of the optical pickup because of constructing the optical pickup by a combination of bulk parts and difficulty is encountered to perform the positional adjustment between the respective parts.

Figure 16:
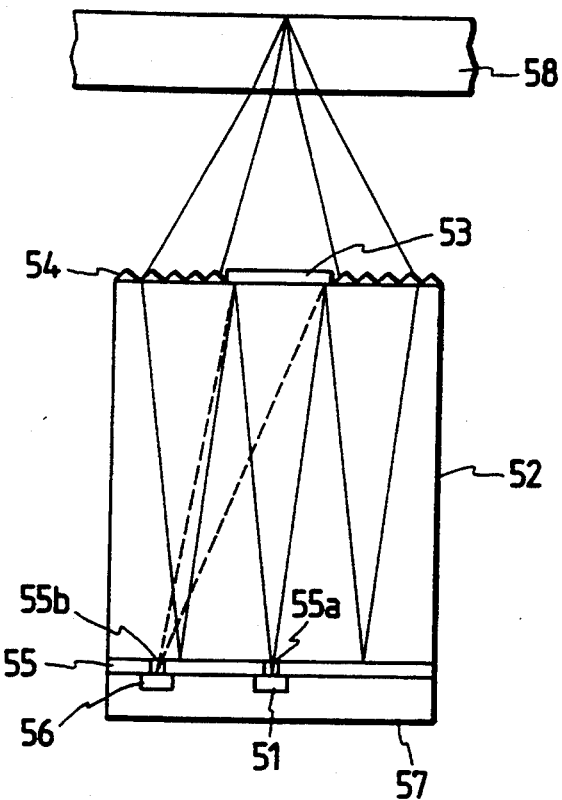
FIG. 16 is an illustration for describing an arrangement of an optical pickup according to a third embodiment of this invention.

A description will be made hereinbelow in terms of an arrangement of an optical pickup according to the third embodiment of this invention. FIG. 16 shows an arrangement of an optical pickup according to the third embodiment of this invention. As shown in FIG. 16, the optical pickup according to this embodiment comprises a semiconductor laser 51, which is a light source, a multi-division photodetector 56 for converting incident light into electric signals, and a glass member 52 made of a glass material. On the upper end portion of the glass member 52 there is provided a first reflecting surface 53 which is a circular grating made on a LiNbO₃ substrate in accordance with the proton exchange method. Around the first reflecting surface 53 and on the same plane there is provided a grating lens for condensing a laser light beam onto a disc 58. The first reflecting surface 53 has a diameter which is ⅓ of the diameter of the grating lens 54. Further, on the lower end portion of the glass member 52 there is provide a second reflecting surface 55 which is made of a reflecting mirror film. The second reflecting surface 55 has first and second through-holes 55a and 55b, and the semiconductor laser 51 and the multi-division photodetector 56 are respectively provided in opposed relation to the first and second through-holes 55a and 55b whereby the first through-hole 55a introduces the laser light from the semiconductor laser 51 into the glass member 52 and the second through-hole 55b leads light to a multi-division photodetector 56. The semiconductor laser 51 and the multi-division photodetector 56 are fixedly interposed between the aforementioned glass member 52 and a resin-made member 57.

Figure 17:
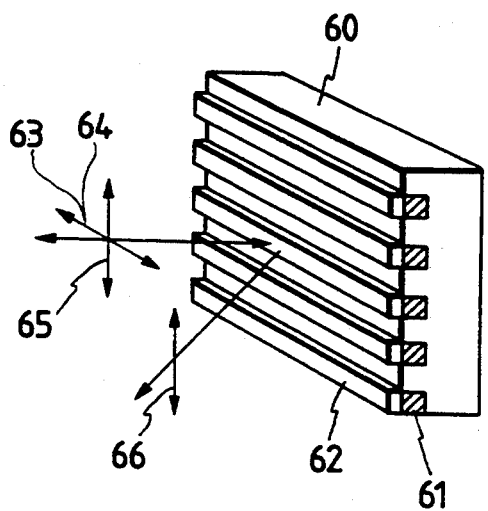
FIG. 17 is a perspective view showing a grating constructed in accordance with the proton exchange method.

Secondly, a description will be made hereinbelow with reference to FIG. 17 in terms of a grating manufactured in accordance with the proton exchange method so as to construct the first reflecting surface 53. In FIG. 17, in this grating, on a LiNbO₃ substrate 60 there are provided lattice-like portions 61 constructed with the periodic proton exchange so as to be periodically arranged and elongated dielectric films 62 formed on the respective lattice-like portions 61. This combination of the lattice-like portion 61 and the dielectric films 62 can offer a deflection and separation function. When the thickness of the dielectric film 62 is adjusted so that phase difference does not occur between the proton exchange area and the area at the outside of the proton exchange area with respect to the deflected light (ordinary light) perpendicular to the crystal optical axis direction, the ordinary light 63 is reflected as the zero-order diffracted light 64, and the extraordinary light 65 which is the deflected light of the incident light in the crystal optical axis direction is diffracted and reflected as the first-order diffracted light 66.

Figure 18:
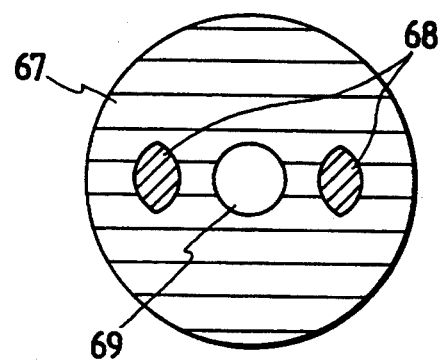
FIG. 18 is a plan view showing the grating shown in FIG. 17.

As illustrated in FIG. 18, the grating (53) includes a proton exchange area 67 that the crystal optical axis direction is perpendicular to the the deflection plane of the outgoing light beam from a semiconductor laser (51) and at least two inclined areas 68 inclined by 45° with respect to the deflection plane of the outgoing light beam. Designated at numeral 69 is a center portion whose diameter is ⅓ of the diameter of the grating (53). This center portion 69 is arranged to cut a light beam, whereby the reflection does not occur many times between the first reflecting surface 53 and the second reflecting surface 55.

In operation of the optical pickup thus arranged, the light beam emitted from the semiconductor later 51 is first diffracted and reflected at the proton exchange area 67 of the first reflecting surface (grating) 53. A portion of the light beam, which is the zero-order diffracted light 64 in the proton area 67 whose crystal optical axis direction is perpendicular to the deflection plane of the outgoing light beam from the semiconductor laser 51, is used for reproducing information. The deflecting direction of the zero-order diffracted light 64 is coincident with the direction of the outgoing light beam from the semiconductor laser 51, and hence it is considered that the outgoing light beam from the semiconductor laser 51 is the same as the light beam due to the mirror surface reflection at the proton exchange area 67 of the first reflecting surface 53. The diffracted and reflected light beam at the first reflecting surface 53 is again reflected at the second reflecting surface 55 so as to be incident on the grating lens 54. The incident light beam on the grating lens 54 is condensed on the photomagnetic disc 58. Here, the deflecting direction of the light beam to be condensed on the photomagnetic disc 58 is coincident with the the deflecting direction of the outgoing light beam from the semiconductor laser 51. The light beam directed to the center portion of the grating lens 54 is cut by the first reflecting surface 53, whereby it is possible to obtain a light spot having a diameter smaller than the Airy disc diameter of the light spot intensity distribution of the aplanatic circular optical system. That is, it is possible to make small the light spot due to the condensing.

Figure 19:
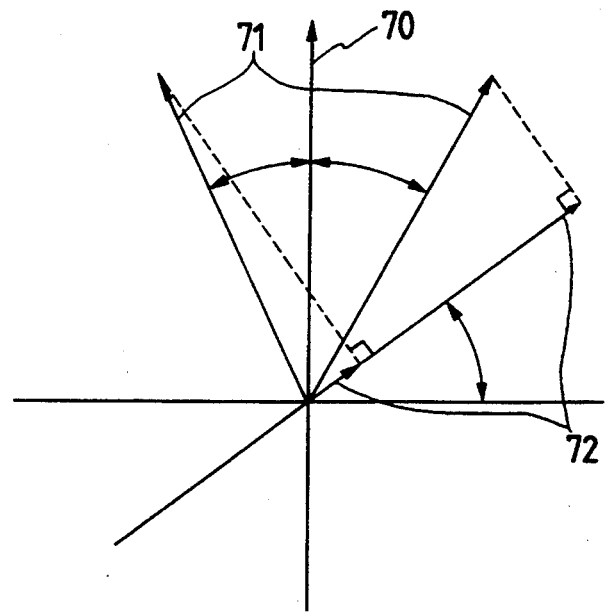
FIG. 19 is an illustration for describing a signal detecting method.

The light beam condensed on the photomagnetic disc 58 is reflected after picking up the recorded signal on the photomagnetic disc 58. Due to the Kerr effect of the photomagnetic disc 58, as illustrated in FIG. 19, this reflected light beam becomes a signal light beam 71 which is rotated from the deflecting direction 70 of the incident light beam, and since the recorded signal of the photomagnetic disc 58 is recorded with "0" and "1" on the basis of the difference of the magnetizing direction, the rotation of the signal light beam 71 occurs in the opposite direction in accordance with the difference ("1", "0"), i.e., variation, of the recorded signal. After passing through the grating lens 54 and the second reflecting surface 55, the signal light beam 71 is incident on the first reflecting surface 53 so as to be diffraction-reflected thereon. Of this diffracted light, the first-order diffracted light 72 diffraction-reflected at the inclined areas 68 is focused on the multi-division photodetector 56, thereby reading the recorded signal and obtaining the focusing error signal and the tracking error signal. The first-order diffracted light 72 becomes a component light of the signal light 71 because the crystal optical axis of the inclined areas 68 has an analyzer function in the direction inclined by 45° with respect to the deflection of the outgoing light beam from the semiconductor laser 51. Thus, the detection of the recorded signal can be performed with the light intensity of the first-order diffracted light 72 varying in accordance with the difference ("0", "1") of the photomagnetic disc 58.

Figure 20:
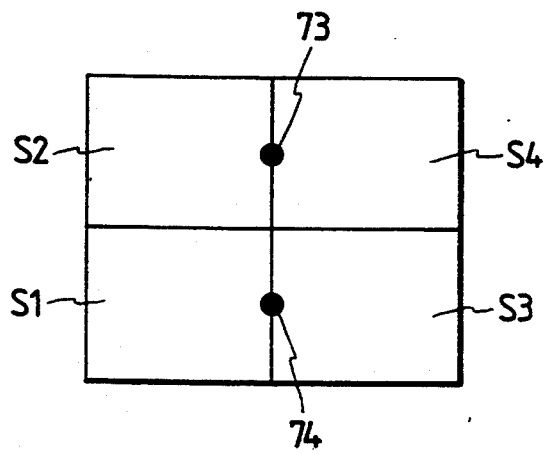
FIG. 20 is an enlarged view showing a multi-division photosensor used in the FIG. 16 optical pickup.

Further, a description will be made hereinbelow with reference to FIG. 20 in terms of error detecting methods which are for detecting the focusing error and the tracking error, respectively. FIG. 20 is an enlarged view showing the multi-division photodetector 56 shown in FIG. 16. The multi-division photodetector 56 comprises 4 sensors designated at S1, S2, S3 and S4. The two first-order diffracted lights 73 and 74 diffraction-reflected at the inclined areas 68 of the first reflecting surface 53 are focused on the borderline between the sensors S1 and S3 and the borderline between the sensors S2 and S4, respectively. The focusing error is detectable in accordance with the knife edge method which detects the variation of the image-formation pattern of the first-order diffracted lights 73 and 74 due to the defocusing at the focusing positions. That is, the focusing error signal can be obtained by calculating the difference signal (V1+V4)−(V2+V3) between the sum of the outputs of the sensors S1 and S4 and the sum of the outputs of the sensors S2 and S3 where V1 to V4 represent the outputs of the sensors S1 to S4, respectively. Further, the tracking error is detectable in accordance with the push-pull method which detects as the intensities of the first-order diffracted lights the variations of the intensities of the lights incident on the two inclined areas 68. That is, the tracking error signal can be obtained by calculating the difference signal (V1+V3)−(V2+V4) between the sum of the outputs of the sensors S1 and S3 and the sum of the outputs of the sensors S2 and S4.

Figure 21:
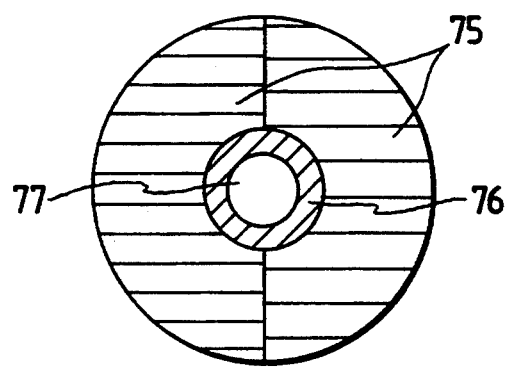
FIG. 21 is a plan view showing a grating in a fourth embodiment of this invention.

A description will be made hereinbelow in terms of a fourth embodiment of this invention. The difference between this embodiment and the above-described third embodiment relates to the arrangement of the first reflecting surface 53. FIG. 21 is a plan view showing a grating which acts as the first reflecting surface 53 in this embodiment. In FIG. 21, the grating includes at least two proton exchange areas 75 whose crystal optical axis direction is perpendicular to the deflection plane of the outgoing light beam from the semiconductor laser 51 and an inclined area 76 inclined by 45° with respect to the deflection plane of the outgoing light beam therefrom. Also included in the grating is a center portion which cuts the light beam so as to prevent the reflection of the light beam. As well as the above-described third embodiment, in this embodiment the measurements of the focusing error and tracking error are effected using the first-order diffracted lights reflected from the two proton exchange areas 75. Further, the detection of the recorded signal on the photomagnetic disc 58 may be effected on the basis of the light intensity of the first-order diffracted light from the inclined area 76.

Figure 22:
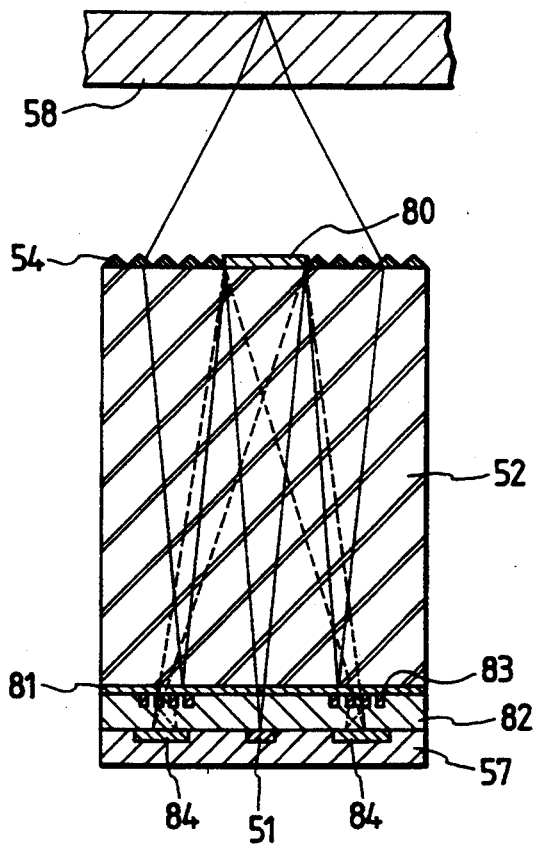
FIG. 22 is a cross-sectional view showing an arrangement of an optical pickup according to a fifth embodiment of this invention.

Moreover, a description will be made hereinbelow in terms of a fifth embodiment of this invention. This embodiment is also suitable for an information recording-/reproducing apparatus which records or reproduces information on and from a photomagnetic disc. FIG. 22 is a cross-sectional view showing an arrangement of an optical pickup according to the fifth embodiment of this invention where parts corresponding to those in FIG. 16 are marked with the same numerals. In FIG. 22, the optical pickup comprises a semiconductor laser 51 which acts as a light source, a glass member 52 made of a glass material, a hologram optical device 80 which acts as the first reflecting surface, a grating lens for condensing a laser beam due to the semiconductor laser 51 onto a photomagnetic disc 58, and a second reflecting surface 81 constructed with a reflection mirror film. The first reflecting surface 80 and the grating lens 54 are provided on the upper portion of the glass member 52 and on the same plane, and the diameter of the first reflecting surface 80 is arranged to be ⅓ of the diameter of the grating lens 54. In this embodiment, also included in the optical pickup are gratings 83 constructed on an LiNbO₃ substrate 82 in accordance with the proton exchange method and two multi-division photodetectors 84. The semiconductor laser 51 and the multi-division photodetectors 84 are fixedly adhered through a resin 57 to the LiNbO₃ substrate 82. These parts are integrally combined with each other.

Figure 23:
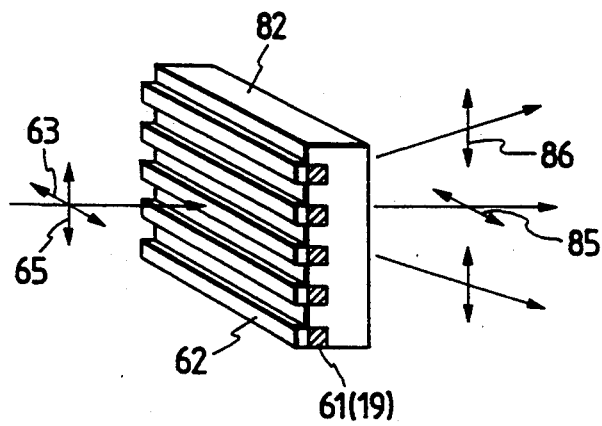
FIG. 23 is an illustration for describing a grating constructed on an LiNbO₃ substrate 82 in accordance with the proton exchange method and used in the FIG. 22 optical pickup.

FIG. 23 is an illustration for describing the grating 83 constructed on the LiNbO₃ substrate 82 in accordance with the proton exchange method. In FIG. 23, this grating 83 comprises lattice-like portions 61 constructed on the LiNbO₃ substrate 82 with the periodic proton exchange and elongated dielectric films 62 formed on the respective lattice-like portions 61 to thereby provide a deflection and separation function. When the thickness of the dielectric film 62 is adjusted so that phase difference does not occur between the proton exchange area and the area at the outside of the proton exchange area with respect to the deflected light perpendicular to the crystal optical axis direction, the ordinary light 63 which is the deflected light of the incident light perpendicular to the crystal optical axis direction passes through the grating 61 and the substrate 82 to become zero-order diffracted light 85, and the extraordinary light 65 which is the deflected light of the incident light in the crystal optical axis direction is diffracted to become first-order diffracted light 86.

Figure 24:
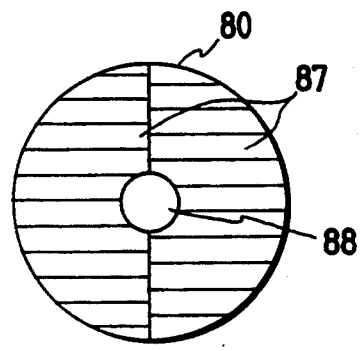
FIG. 24 is a plan view showing a hologram optical device used in the FIG. 22 optical pickup.

As illustrated in FIG. 24, the first reflecting surface (hologram optical device) 80 comprising at least two hologram areas 87 and a center portion 88, the center portion 88 having a diameter which is ⅓ of the diameter of the first reflecting surface 80 and having a function to cut the light beam whereby the reflection does not occur many times between the first reflecting surface 80 and the second reflecting surface 81.

Figure 25:
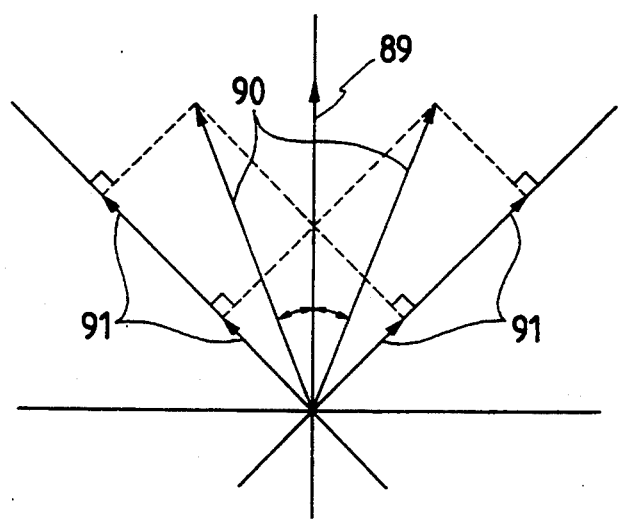
FIG. 25 is an illustration for describing a signal detection in the FIG. 22 optical pickup.

In operation, the light beam emitted from semiconductor laser 51 is first diffraction-reflected on the first reflecting surface 80. Here, the diffraction-reflected light is similar to the light due to a mirror surface reflection because the light to be used for the reproduction of the information is the zero-order diffracted light. The light beam diffraction-reflected on the first reflecting surface 80 is again reflected on the second reflecting surface 81 and then incident on the grating lens 54 so as to be condensed on the photomagnetic disc 58. Since the center portion of the light beam incident on the grating lens 54 is cut by the first reflecting surface 80 portion, it is possible to obtain a spot image having a diameter smaller than the Airy disc diameter of the spot image intensity distribution in an aberration-free circular aperture optical system, that is, it is possible to make small the light spot. The light beam condensed on the photomagnetic disc 58 is reflected therefrom after picking up the recorded signal. Due to the Kerr effect of the photomagnetic disc 58, as illustrated in FIG. 25, this reflected light beam becomes the signal light 90 rotated from the deflecting direction 89 of the incident light, while, since the recorded signal of the photomagnetic disc 58 is recorded with "0" and "1" on the basis of the difference of the magnetizing direction, the rotation of the signal light 90 occurs in the opposite direction with respect to the deflecting direction 89 of the incident light in accordance with the difference of the recorded signal, i.e., the variation from "1" to "0" or from "0" to "1" of the recorded signal.

After passing through the grating lens 54 and being reflected on the second reflecting surface 81, the signal light 71 is incident on the first reflecting surface 80 so as to be diffracted-reflected. The first-order diffracted lights due to the two hologram areas 87 of the first reflecting surface 80 are respectively diffracted by the gratings 83, which is manufactured on the LiNbO$_3$ by the proton exchange method and whose crystal optical axis is inclined 45° with respect to the deflected light of the outgoing light from the semiconductor laser 51, and then incident on the two multi-division photodetectors 84. Here, the first-order diffracted light 91 (see FIG. 25) due to the grating 83 is the deflected light of the direction inclined by 45° with respect to the deflected light of the outgoing light beam from the semiconductor laser 51, and the zero-order diffracted light 92 (see FIG. 25) is the deflected light of the direction perpendicular to the incident light. Thus, since the grating 83 has an analyzer function for the deflection and separation with respect to the incident light and the light intensities of the zero-order diffracted light 92 and the first-order diffracted light 91 vary in accordance with "0" and "1" of the recorded signal on the photomagnetic disc 58, it becomes possible to detect the recorded signal on the photomagnetic disc 58 by the difference detection of the zero-order diffracted light 92 and the first-order diffracted light 91.

Figure 26:
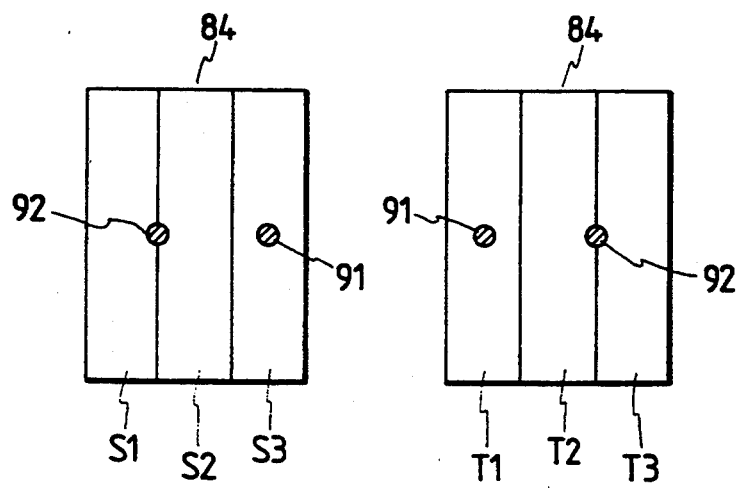
FIG. 26 shows arrangements of two multi-division photodetectors used for FIG. 22 optical pickup.

Further, a description will be made in terms of the focusing and tracking error detection due to the two multi-division photodetectors 84. FIG. 26 shows arrangements of the two multi-division photodetectors 84. One of the two multi-division photodetectors 84 comprises 3 sensors S1, S2 and S3 which respectively generate the outputs V1, V2 and V3, and the other multi-division photodetector 84 comprises 3 sensors T1, T2 and T3 which respectively generate the outputs W1, W2 and W3. The zero-order diffracted lights 92 due to the gratings 83 are focused on the borderline between the sensors S1 and S2 and the borderline between the sensors T2 and T3, respectively, and the first-order diffracted lights 91 are focused in the sensors S3 and T1, respectively. The focusing error is detected in accordance with the knife edge method which detects the variation of the image-formation pattern caused by the defocusing at the focusing position of the first-order diffracted light 91. That is, the focusing error detection is effected by calculating the difference signal $(V1+W3)-(V2+W2)$ between the sum of the outputs of the sensors S1 and T3 and the sum of the outputs of the sensors S2 and T2. Further, the tracking error is detected in accordance with the push-pull method which detects as the intensities of the first-order diffracted lights the variations of the intensities of the lights incident on two proton exchange areas. That is, the tracking error detection is effected by calculating the difference signal $(V1+V2)-(W2+W3)$ between the sum of the outputs of the sensors S1 and S2 and the sum of the outputs of the sensors T2 and T3. Moreover, the detection of the recorded signal on the photomagnetic disc 58 is effected by calculating the difference signal $(V1+V2)-V3$ between the sum of the outputs of the sensors S1 and S2 and the output of the sensor S3.

According to this embodiment, the moving-back-and-forth of the light due to the semiconductor laser 51 between the first and second reflecting surfaces 80 and 81 ensures the optical path length, and further the optical pickup can integrally be constructed so as to reduce its size and weight.

Here, although in this embodiment the two multi-division photodetectors 84 are disposed at different positions, it is also possible that the two multi-division photodetectors 84 are combined with each other as one unit comprising 6 sensors and disposed at one position. Further, it is also appropriate that the grating 82 is constructed by a diffraction device having a periodic structure below ½ of the wavelength of the incident light.

Figure 27:
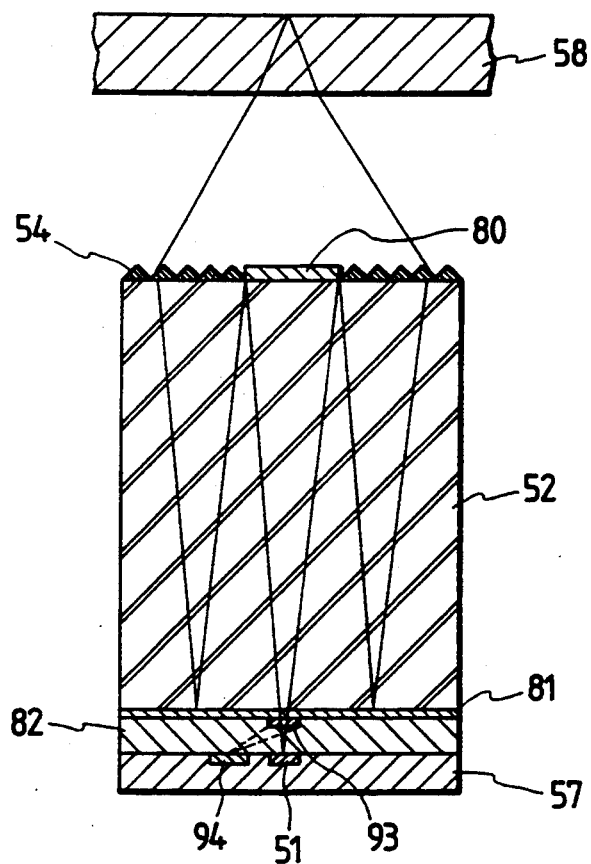
FIG. 27 is a cross-sectional view showing an arrangement of an optical pickup according to a sixth embodiment of this invention.

A sixth embodiment of this invention will be described hereinbelow with reference to FIG. 27 where parts similar to those in FIG. 22 are marked with the same numerals and the detailed description thereof will be omitted for brevity. In FIG. 27, in this embodiment, one grating 93 (corresponding to the grating 83 in FIG. 22), which is manufactured on an LiNbO$_3$ substrate 82 in accordance with the proton exchange, is disposed within the path of the outgoing light from the semiconductor laser 51, and arranged to comprise at least two areas whose crystal optical axis direction is inclined by 45° with respect to the deflection plane of the outgoing light beam from the semiconductor laser 51. Further, one multi-division photodetector 94 (corresponding to the two multi-division photodetectors 84 in FIG. 22) is disposed.

In operation, the outgoing light beam from the semiconductor laser 51 first passes through the LiNbO$_3$ substrate 82 to be directed toward the first reflecting surface (hologram device) 80 and reflected thereon to be directed to the second reflecting surface 81. The light reflected on the second reflecting surface 81 passes through the grating lens 54 to be condensed and incident on the photomagnetic disc 58. The light is reflected after picking up the recorded signal on the photomagnetic disc 58 and passes through the grating lens 54 to be directed to the second reflecting surface 81. The light reflected on the second reflecting surface 81 advances to the first reflecting surface 80. The zero-order diffracted light due to the first reflecting surface 80 is diffracted at the two areas of the grating 93, while the first-order diffracted lights due to the two areas of the grating 93 are respectively focused on the multi-division photodetector 94 so as to be used for reading the recorded signal on the photomagnetic disc 58 and detecting the focusing and tracking errors. As described above, this first-order diffracted light becomes the deflected light of the direction inclined by 45° with respect to the incident light of the grating 93 and the deflecting direction varies in accordance with the recorded signal so that the intensity of the deflected light varies. Accordingly, the signal detection can be effected on the basis of the variation of the light intensity.

Figure 28:
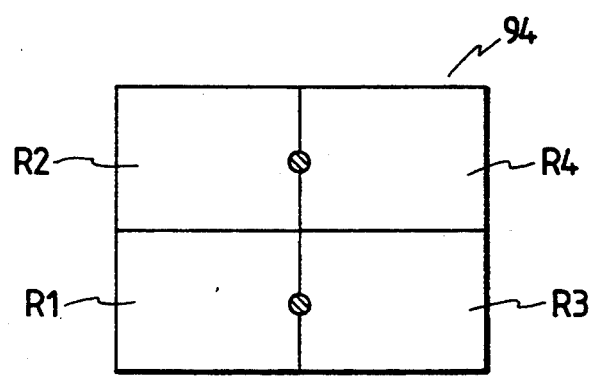
FIG. 28 shows an arrangement of a multi-division photodetector to be used in the FIG. 27 optical pickup.

Secondly, a description will be made with reference to FIG. 28 in terms of the error detection by the multi-division photodetector 94. FIG. 28 shows an arrangement of the multi-division photodetector 94. In FIG. 28, the multi-division photodetector 94 comprises 4 sensors R1, R2, R3 and R4 which generate the outputs U1, U2, U3 and U4. The first-order diffracted lights due to the two areas of the grating 93 are focused on the borderline between the sensors R1 and R3 and the borderline between the sensors R2 and R4. The focusing error is detected in accordance with the knife edge method which detects the variation of the image-formation pattern due to the defocusing at the focusing position. That is, the focusing error detection is effected by calculating the difference signal (U1+U4)−(U2+U3) between the sum of the outputs of the sensors R1 and R4 and the sum of the outputs of the sensors R2 and R3. Further, the tracking error is detected in accordance with the push-pull method which detects as the intensities of the first-order diffracted lights the variations of the intensities of the lights incident on the two areas of the grating 93. That is, the tracking error detection is effected by calculating the difference signal (U1+U3)−(U2+U4) between the sum of the outputs of the sensors R1 and R3 and the sum of the outputs of the sensors R2 and R4.

In this embodiment, it is also appropriate to use a reflecting mirror as the first reflecting surface 80.

Figure 29:
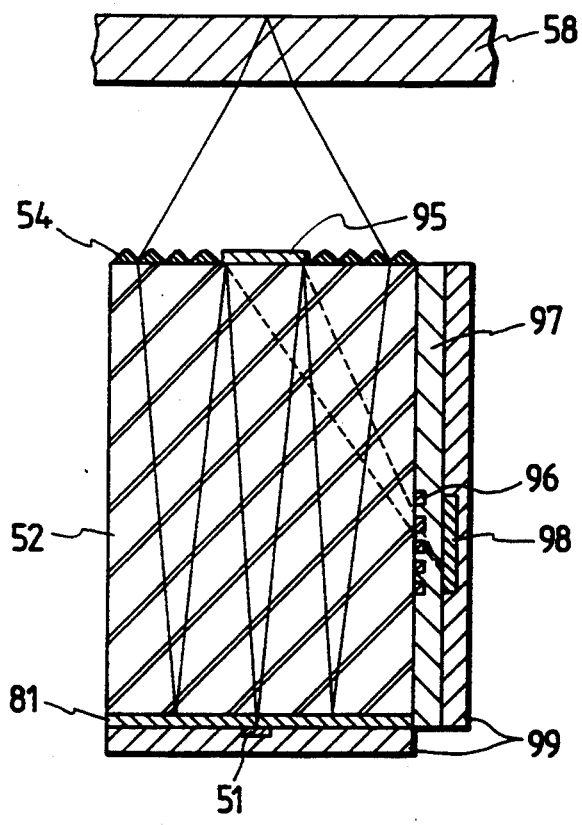
FIG. 29 is a cross-sectional view showing an arrangement of an optical pickup according to a seventh embodiment of this invention.

Moreover, a seventh embodiment of this invention will be described hereinbelow with reference to FIG. 29. FIG. 29 is a cross-sectional view showing an arrangement of an optical pickup according to the seventh embodiment of this invention where parts similar to those in FIG. 27 are marked with the same numerals and the detailed description will be omitted for brevity. In FIG. 29, one feature of this embodiment is that a grating 96 (corresponding to the grating 93 in FIG. 27) which is manufactured on an LiNbO$_3$ substrate 97 in accordance with the proton exchange method, is disposed on a side surface of the glass member 52, and the semiconductor laser 51 is fixedly attached to the second reflecting surface 81, provided at the lower portion of the glass member 52, by means of a resin 99 and a multi-division photodetector 98 (corresponding to the multi-division photodetector 94 in FIG. 27) is fixedly attached to the other side of the LiNbO$_3$ substrate 97 by means of a resin 99. This optical pickup is integrally constructed.

In operation, the outgoing light beam from the semiconductor laser 51 is condensed on the photomagnetic disc 58 through the first reflecting surface (hologram device) 95, second reflecting surface 81 and grating lens 54. After picking up the recorded signal on the photomagnetic disc 58, the light is incident on the first reflecting surface 95 through the grating lens 54 and second reflecting surface 81. The first-order diffracted lights due to the first reflecting surface 95 are respectively diffracted by the grating 96 on the LiNbO$_3$ substrate 97, whose crystal optical axis is inclined by 45° with respect to the deflection of the outgoing light from the semiconductor laser 51, so as to be focused on the multi-division photodetector 98. The error detections and the signal reading are effected as well as in the above-described sixth embodiment.

Here, it is appropriate that the grating 96 used as a deflecting device can be replaced with a diffraction device having a periodic structure below ½ of the wavelength of the incident light.

Figure 30:
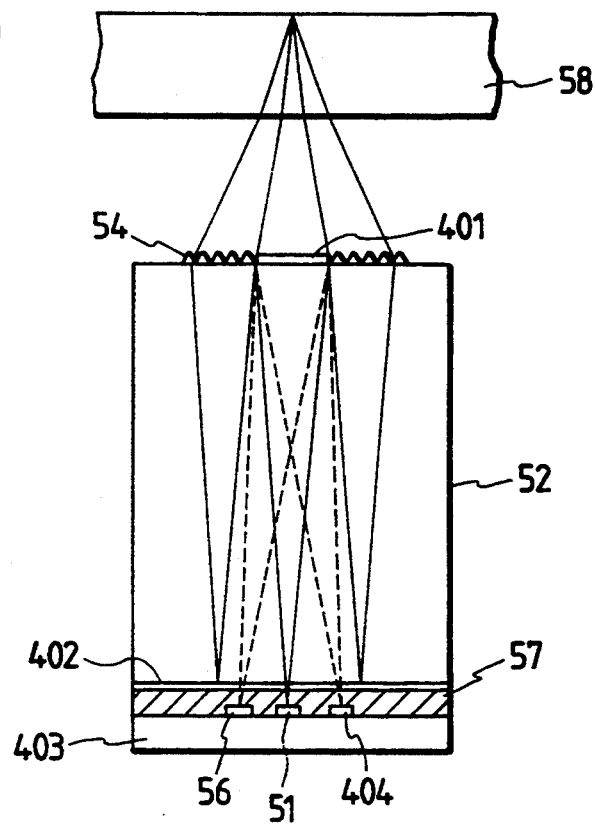
FIG. 30 is a cross-sectional view showing an arrangement of an optical pickup according to an eighth embodiment of this invention.

Still further, a description will be made hereinbelow in terms of an eighth embodiment of this invention. This embodiment relates to an arrangement which is capable of monitoring the quantity of outgoing light from the semiconductor laser to detect the deteriorated (worsened) state of the semiconductor laser and always ensure a stable laser light output. FIG. 30 is a cross-sectional view showing an arrangement of an optical pickup according to the eighth embodiment of this invention. In FIG. 30, the optical pickup similarly includes a semiconductor laser 51, a glass member 52, first and second reflecting surfaces 401 and 402 disposed in opposed relation to each other, a grating lens 54 disposed around the first reflecting surface 401 and a multi-division photodetector 56. The grating lens 54 and the first reflecting surface 401 are disposed on the upper end portion of the glass member 52 to be in the same plane. The first reflecting surface 401 has a circular configuration whose diameter is ⅓ of the diameter of the grating lens 54. In addition, the optical pickup includes a monitoring photodetector 404. The semiconductor laser 51, the monitoring photodetector 404 and the multi-division photodetector 56 are fixedly attached through a sealing resin 57 to the glass member 52 (the second reflecting surface 402). The semiconductor laser 51 is directly and fixedly attached onto a heat radiating plate 403.

Figure 31:
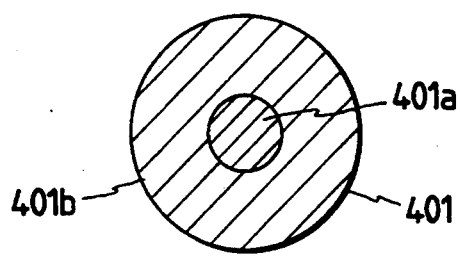
FIG. 31 shows an arrangement of a first reflecting surface used in the eighth embodiment of this invention.

FIG. 31 shows an arrangement of the first reflecting surface 401. The first reflecting surface 401 has at its center portion a reflection type hologram 401a whose radius is ⅓ of the radius of the first reflecting surface 401. When the light beam from the semiconductor laser 51 arrives at the reflection type hologram 401a, the first-order diffracted light is generated. The generated first-order diffracted light is arranged to be led to the monitoring photodetector 404, thereby cutting (shielding) the mirror surface reflection light component from the center portion so as to prevent occurrence of the multiple reflection between the first and second reflecting surfaces 401 and 402. Further, in the first reflecting surface 401, a portion or all portions other than the center portion are constructed to be a reflection type hologram which causes the first-order diffracted light to be led to the multi-division photodetector 56.

Figure 32:
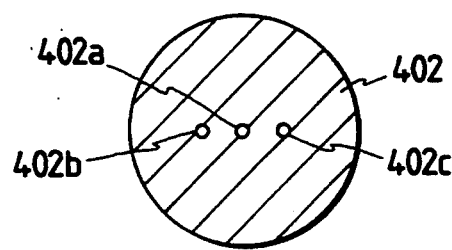
FIG. 32 shows an arrangement of a second reflecting surface used in the eighth embodiment of this invention.

FIG. 32 shows an arrangement of the second reflecting surface 402. As illustrated in FIG. 32, the second reflecting surface 402 has therein a window 402a for the outgoing light beam from the semiconductor laser 51, a window 402b for the light beam to the multi-division photodetector 56 and a window 402c for the light beam to the monitoring photodetector 404.

In operation, the outgoing light beam from the semiconductor laser 51 is spread out and incident on the first reflecting surface 401. The incident light is reflected as the first-order diffracted light from reflection type hologram 401a of the center portion of the first reflecting surface 401 so as to led to the monitoring photodetector 404, and further reflected as the mirror surface reflection light at the first reflecting surface 401 and the zero-order diffracted light from the reflection type hologram 401b so as to be directed to the second reflecting surface 402. The reflected light beam on the second reflecting surface 402 is condensed through the grating lens 54 on the photomagnetic disc 58. The light beam condensed on the photomagnetic disc 58 is reflected after picking up the recording signal on the photomagnetic disc 58. The light beam reflected from the photomagnetic disc 58 again passes through the grating lens 54 to advances to the second reflecting surface 402. The light reflected from the second reflecting surface 402 is incident on the first reflecting surface 401. This incident light is reflected as the first-order diffracted light due to the reflection type hologram 401b so as to be focused on the multi-division photodetector 56. Here, the reflection type hologram 401b comprises at two areas whose interference patterns are different from each other and two focused spots are formed on the multi-division photodetector 56, whereby it is possible to obtain the focusing error signal and tracking error signal on the basis of the outputs of the multi-division photodetector 56. On the other hand, the first-order diffracted light from the reflection type hologram 401a at the center portion of the first reflecting surface 401 is condensed on the monitoring photodetector 404. The output of the monitoring photodetector 404 is indicative of the outgoing light output from the semiconductor laser 51, thereby checking or monitoring the deteriorated state of the semiconductor laser 51. Further, if the output of the monitoring photodetector 404 is feedbacked to a drive circuit of the semiconductor laser 51 to control the drive current, it is possible to obtain the stable laser light output.

Figure 33:
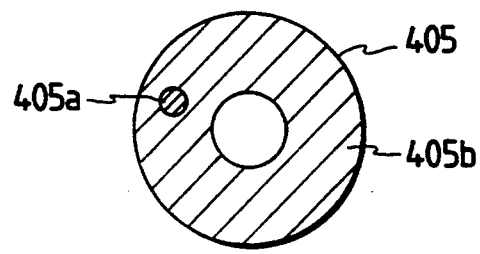
FIG. 33 is an illustration of an arrangement of a first reflecting surface to be used in to an optical pickup according to a ninth embodiment of this invention.

FIG. 33 is an illustration of an arrangement of a first reflecting surface to be used in to an optical pickup according to a ninth embodiment of this invention. The other arrangement of this optical pickup are similar to those in the eighth embodiment of this invention. This first reflecting surface 405 has a circular configuration and has a center portion whose radius is ½ of the radius of the first reflecting surface 405. The center portion is arranged so as to prevent the light beam from being reflected therefrom. At a portion or all portions other than the center portion there are formed a reflection type hologram 405a which is for leading the first-order diffracted light to the monitoring photodetector 404 and a reflection type hologram 405b for leading the first-order diffracted light to the multi-division photodetector 56. As well as the eighth embodiment, the outgoing light output of the semiconductor laser 51 can be monitored by detecting the output of the of the monitoring photodetector 404 on which the the first-order diffracted light reflected from the reflection type hologram 405a is condensed.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An optical pickup comprising:

a transparent member for transmitting light, said transparent member having a first surface being flat and facing to an optical disk in parallel with each other;

first reflecting means provided on said first surface of said transparent member for reflecting light;

deflecting means disposed on said first surface of said transparent member for deflecting light, so that said deflecting means is not overlapped with said first reflecting means;

light-emitting means disposed closely to a second surface of said transparent member, said second surface being flat and disposed in opposed relation to said first surface;

light detecting means for detecting light reflected by said first reflecting means, said light detecting means being not overlapped with said light-emitting means; and second reflecting means for reflecting light, said second reflecting means being provided closely to said second surface of said transparent member.

2. An optical pickup as claimed in claim 1, wherein said deflecting means is a grating.

3. An optical pickup as claimed in claim 1, wherein said deflecting means is a diffraction device having a periodic structure below ½ of a wavelength of the reflected light from said optical disc.

4. An optical pickup comprising:

light-emitting means for emitting light;

lens means for condensing light on an optical disk;

first reflecting surface means disposed at a center portion of said lens means for reflecting the light from said light-emitting means;

second reflecting surface means for reflecting light, reflected by said first reflecting surface means, toward said lens means;

deflecting means disposed in a path of reflected light from said optical disc for deflecting and separating the reflected light from said optical disc; and light-receiving means for receiving light from said deflecting means, wherein said deflecting means is a grating which is manufactured on an LiNbO₃ substrate in accordance with a proton exchange method and which is inclined 45° with respect to a deflection plane of outgoing light of said light-emitting means.

5. An optical pickup as claimed in claim 4, wherein said deflecting means is a grating.

6. An optical pickup as claimed in claim 4, wherein said deflecting means is a diffraction device having a periodic structure below ½ of a wavelength of the reflected light from said optical disc.

7. An optical pickup comprising:

light-emitting means for emitting light;

lens means for condensing light on an optical disk;

first reflecting surface means disposed at a center portion of said lens means for reflecting the light from said light-emitting means;

second reflecting surface means for reflecting light, reflected by said first reflecting surface means, toward said lens means;

transmission type grating means disposed on said second reflecting surface means for diffracting light which is reflected by said optical disc and which is reflected by said second reflecting surface means and said first reflecting surface means after passing through said lens means, said transmission type grating means being manufactured on an LiNbO$_3$ substrate in accordance with a proton exchange method and inclined by 45° with respect to a deflection plane of outgoing light of said light-emitting means; and light-receiving means for receiving light from said transmission type grating means.

8. An optical pickup comprising:

a transparent member for transmitting light, said transparent member having a first surface being flat and facing to an optical disk in parallel with each other;

first reflecting means provided on said first surface of said transparent member for reflecting light;

light-emitting means disposed closely to a second surface of said transparent member, said second surface being flat and disposed in opposed relation to said first surface;

deflecting means being a transmission type grating manufactured on an LiNbO$_3$ substrate in accordance with a proton exchange method and inclined 45° with respect to a deflection plane of outgoing light of said light-emitting means, said deflecting means being provided on said first surface of said transparent member so that said deflecting means is not overlapped with said first reflecting means;

light detecting means for detecting light reflected by said first reflecting means, said light detecting means being not overlapped with said light-emitting means; and second reflecting means for reflecting light, said second reflecting means being provided closely to said second surface of said transparent member.

* * * * *